No. 895,815.
E. I. THOMAS.
GAS LEAK DETECTOR.
APPLICATION FILED APR. 29, 1908.
PATENTED AUG. 11, 1908.
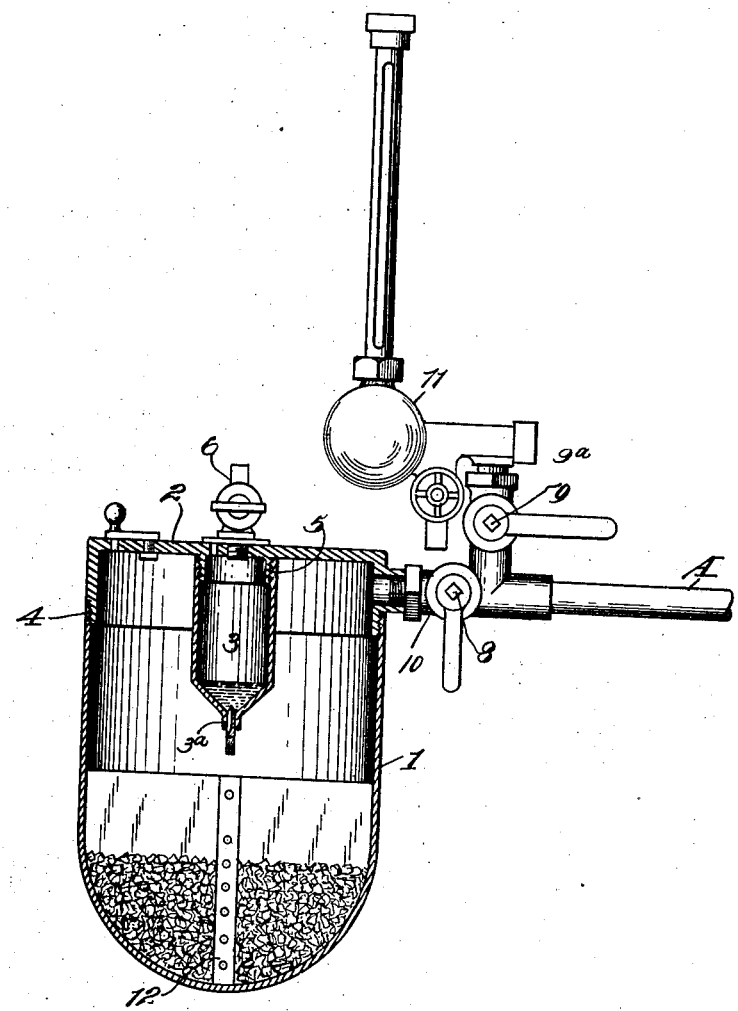
WITNESSES
INVENTOR;
Ellis I. Thomas:
BY Geo. H. Strong.
ATTORNEY

UNITED STATES PATENT OFFICE.

ELLIS I. THOMAS, OF OAKLAND, CALIFORNIA.

GAS-LEAK DETECTOR.

No. 895,815.　　　Specification of Letters Patent.　　　Patented Aug. 11, 1908.

Application filed April 29, 1908. Serial No. 430,026.

*To all whom it may concern:*

Be it known that I, ELLIS I. THOMAS, citizen of United States, residing at Oakland, in the county of Alameda and State of California, have invented new and useful Improvements in Gas-Leak Detectors, of which the following is a specification.

My invention relates to a device for the detection of leaks in gas pipes, and other elastic fluid leaks.

It consists in the combination of parts, and in details of construction which will be more fully explained by reference to the accompanying drawings, in which—the view is a partial section, partial elevation of the device as applied.

After gas pipes have been placed in buildings, they must be inspected to insure against leakage, and such inspection should be completed before the walls through which the pipes pass, are finished.

It is the object of my invention to provide such an apparatus, which includes a means for generating an inflammable gas and distributing it through the pipes, means for indicating the pressure within the pipes, and to show if there is any leakage.

A is a gas main or pipe which may be a part of the system of pipes to be tested. This is connected through a pipe 10 with the generator of the inflammable gas.

In the present case I have designed my apparatus to be used for the formation of acetylene gas, and the body is of any suitable or desired size adapted to contain carbid of calcium. This chamber may be made of a hemispherical or other suitably shaped bottom, and a perforated pipe 12 extends upwardly from the bottom into the body of the chamber. The chamber may be divided into compartments, as shown, if found desirable.

In line above the perforated pipe 12 is a water reservoir 3 having a small discharge opening 3ᵃ at the bottom through which water may be allowed to drip into the tube 12 to be thence delivered outwardly through the perforations into the mass of carbid, thus generating a gas.

The water-container 3 is screw-threaded at the top, as shown at 5, and fits corresponding screw-threads in the cap 2. The cap 2 is also threaded at 4 to screw into the top of the chamber 1.

The parts are assembled by first filling the chamber 3 with water, then screwing it into the cap, and afterwards screwing the cap upon the body 1.

In the upper part of the chamber 3 is a cock 6 which, when closed prevents air from entering, and will thus prevent the water from escaping into the carbid chamber. When this cock is opened, the water will be allowed to flow by reason of the admission of air into the upper part of the chamber, and the flow may be regulated by the amount of opening of the air cock. The generated gas will pass outwardly into the pipes A through the pipe 10, but before this is done, it is desirable to know whether the pipes are tight or not. For this purpose I have shown a cock 8 in the pipe 10 which may be temporarily closed so that there is no connection between the pipe A and the adjusting apparatus.

By means of a branch pipe having a cock at 9, connection may be made from the pipe A through the cock 9 and the branch pipe 9ᵃ, with a mercury gage 11. This gage is of any suitable or well known description, and when the connection is opened through the cock 9, air or other pressure may be applied through the pipe A, thus forcing the mercury up in the gage tube. This being allowed to stand for a short time will determine at once whether there are any leaks in the pipes as such leaks would cause the mercury to sink in the gage. This having been determined, and the movement of the mercury, showing that there are leakages, the cock 9 is closed, the cock 8 is opened, and the acetylene gas from the generator will pass out through the pipes A and connections throughout the system.

The gas being inflammable it can be ignited at any point where there is any leakage, and the point of leakage thus determined, and the leak corrected.

The peculiar odor of the acetylene gas is such that it will make itself known at any small point of leakage, and will insure a correct diagnosis of the trouble which cannot be so well ascertained by the use of ether or similar vapors.

Having thus described my invention, what I claim and desire to secure by Letters Patent is—

1. In a testing apparatus of the character described, the combination of an acetylene generator, connections between the generator and the pipe system to be tested; a supplemental pipe connecting with the system and having a mercury gas-gage connected therewith, a cock in the pipe system between the generator and the supplemental pipe, by which the system may be cut out of connection with the generator, and a cock in the supplemental pipe by which the connection with the mercury gage may be opened to register pressure from within the pipe system.

2. In an apparatus of the character described, an acetylene generator, a pipe or passage connecting said generator with the pipe system to be tested, a cock closable between said system and the generator, a branch pipe connecting with the system exterior to said cock, and having a controlling cock in its length, and a mercury gage connecting with the pipe and adapted to indicate a pressure applied to the pipe system.

In testimony whereof I have hereunto set my hand in presence of two subscribing witnesses.

ELLIS I. THOMAS.

Witnesses:
J. M. LENNAN,
ARTHUR OPPENHEIMER.